United States Patent [19]

Arai et al.

[11] Patent Number: 5,002,028

[45] Date of Patent: Mar. 26, 1991

[54] THROTTLE CONTROL SYSTEM FOR VEHICULAR INTERNAL COMBUSTION ENGINE

[75] Inventors: Yasuhisa Arai; Norio Suzuki; Ichiro Sakai; Koji Sasajima; Shusuke Akazaki; Yuji Kawaguchi, all of Saitama, Japan

[73] Assignee: Honda Giken Kogyo Kabushiki Kaisha, Tokyo, Japan

[21] Appl. No.: 385,573

[22] Filed: Jul. 26, 1989

[30] Foreign Application Priority Data

Jul. 27, 1988 [JP] Japan .................. 63-187904
Jul. 30, 1988 [JP] Japan .................. 63-190954
Jul. 30, 1988 [JP] Japan .................. 63-190955
Aug. 3, 1988 [JP] Japan .................. 63-193968

[51] Int. Cl.⁵ ............................................ F02D 7/00
[52] U.S. Cl. ................................. 123/399; 123/340
[58] Field of Search .................. 123/399, 400, 340

[56] References Cited

U.S. PATENT DOCUMENTS

| | | | |
|---|---|---|---|
| 4,691,677 | 9/1987 | Hotate et al. | 123/399 |
| 4,760,825 | 8/1988 | Morita | 123/3 X |
| 4,765,295 | 8/1988 | Ishikawa et al. | 123/399 |
| 4,765,296 | 8/1988 | Ishikawa et al. | 123/399 |
| 4,791,902 | 12/1988 | Ishikawa et al. | 123/399 |

FOREIGN PATENT DOCUMENTS 2154763 9/1985 United Kingdom ............ 123/399
2154765 9/1985 United Kingdom ............ 123/399

OTHER PUBLICATIONS

Patent Abstract of JP Publication No. 60138246 & 63109258 (in English).

*Primary Examiner*—Raymond A. Nelli
*Attorney, Agent, or Firm*—Lyon & Lyon

[57] ABSTRACT

Throttle control system for a vehicular internal combustion engine equipped with a stepper motor connected to a throttle valve provided at an engine air intake passage, wherein the position (the opening degree) of the throttle valve is controlled by the stepper motor in response to the vehicular engine operation. In one embodiment, various throttle positions are once determined including positions for engine idling and vehicle cruising and the largest of the positions is selected for optimally satisfying the whole operating condition. In another embodiment, when the engine is idling, the throttle valve is controlled such that engine speed converges toward a target speed. In the other embodiment, the stepper motor is varied its pulse rate and chopping duty for optimally control the throttle position according to the vehicular engine operation.

20 Claims, 16 Drawing Sheets

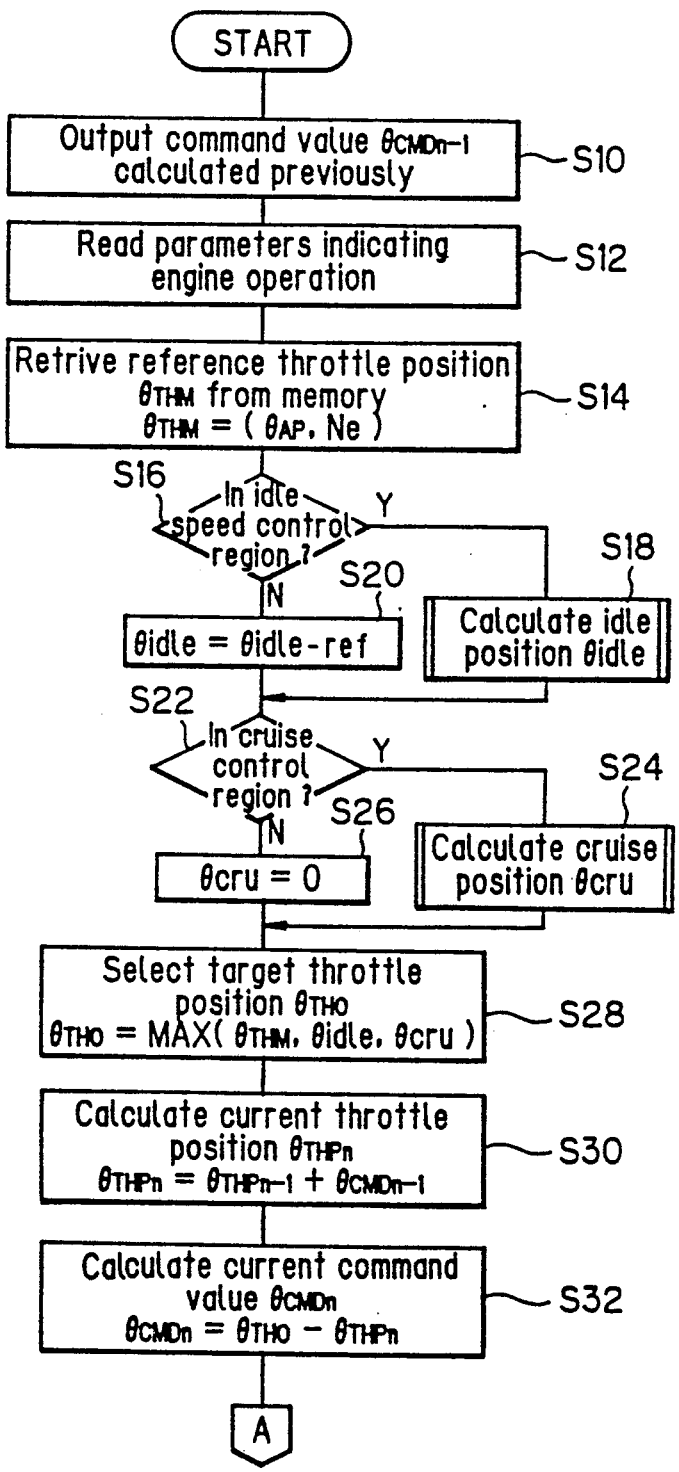

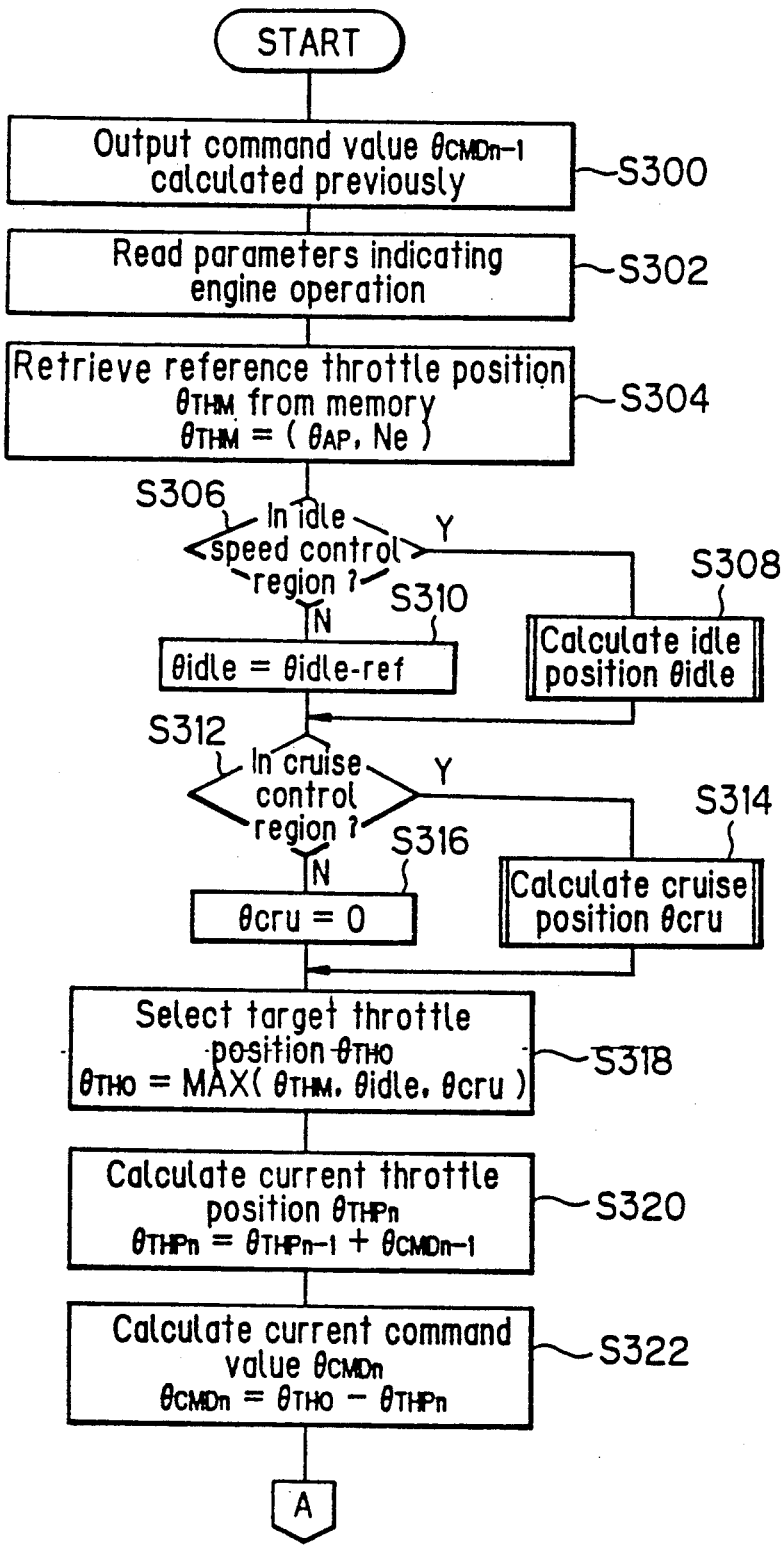

THROTTLE CONTROL SYSTEM FOR VEHICULAR INTERNAL COMBUSTION ENGINE

BACKGROUND OF THE INVENTION

1. Field of the Invention

This invention relates to a throttle control system for vehicular internal combustion engine, more particularly to such a system wherein an actuator such as a stepper motor is connected with the throttle valve and the position of the throttle valve is controlled by the actuator in response to the engine operating condition.

2. Description of the Prior Art

In vehicular internal combustion engines it is well known to employ idle speed control techniques for maintaining a constant engine speed during idling. Cruise control technology for maintaining a constant speed during driving is also widely employed. While these two types of control were originally conducted separately using independent systems, technology for combining the control functions in a single system has been proposed as, for example, in Japanese Patent Publication 62(1987)-115749.

In the proposed system using a single apparatus for controlling the throttle valve opening during both idling and cruise driving as well as, in some cases, in response to other engine operation conditions, it has not been completely clarified how reconciliation should be obtained between the two or more throttle positions determined in cases where two or more pertinent engine conditions occur simultaneously.

It is therefore a first object of the invention to overcome the aforesaid shortcomings of the conventional control system by providing a throttle control system wherein the throttle position can be optimally controlled to satisfy both the idle speed control and the cruise control even under engine operating conditions in which the idle speed control region and the cruise control region overlap.

Where the stepper motor is used for opening and closing the throttle valve, however, the characteristics of this type of motor will cause stepwise changes in the throttle position which will in turn cause the amount of intake air to change stepwise, making it impossible to vary the amount of intake air smoothly as can be done when the position of the throttle valve is determined directly by the accelerator pedal. The stepwise changes in the amount of intake air are determined by the bore of the intake air passage (the area of the throttle valve) and the step angle of the stepper motor. The bore of the intake air passage is determined during engine design on the basis of various factors including the desired engine output and, therefore, cannot readily be changed solely for the purpose of eliminating stepwise change in intake air supply. While countermeasures can be taken on the side of the stepper motor such as by increasing the number of motor poles or by increasing the gear speed reduction ratio, there is a limit to the effect that can be obtained by these means.

Therefore, the second object of this invention is to overcome the aforesaid shortcomings of the prior art by providing a throttle control system wherein the position of the throttle valve can be finely controlled when driven by the stepper motor.

Furthermore, the vehicle battery is used as the power source for the stepper motor. This means that the battery voltage must be maintained at not less than a prescribed level for proper operation of the stepper motor. Thus the conventional practice has been to constantly detect the battery voltage and to correct the motor command value accordingly, as disclosed for example in Japanese Laid-open Patent Publication 61(1986)-19946. When this arrangement is used, however, it is necessary for monitoring the battery voltage to convert the voltage sensor output into a digital signal and to compare the converted signal with a reference value. The operation and structure thus become complex.

It is therefore a third object of the present invention to provide a throttle control system wherein decrease in the battery voltage can be easily detected and the command value supplied to the stepper motor corrected accordingly so that the stepper motor operates properly even when the battery voltage has dropped.

The fourth object of the invention is to provide a throttle control system wherein highly optimum throttle position control is realized by varying the pulse rate and the chopping duty of the command signal supplied to the stepper motor.

Further object of the invention is to provide a throttle control system wherein the throttle position is controlled using the stepper motor in such manner that ramping drive of the pulse motor is optimally controlled satisfying real-time operation requirements.

For realizing the aforesaid objects, the invention provides a system for controlling throttle position in a vehicular internal combustion engine including first means for detecting operating condition of the engine including the degree of depression of an accelerator pedal provided on the vehicle floor, second means for determining a target position of a throttle valve provided in an engine air intake passage in accordance with the detected degree of depression of the accelerator pedal, control means for determining a command value in accordance with the determined target position and actuator means connected to the throttle valve for moving the valve in response to the command value. The system is arranged such that the second means further determines an idle throttle position when the engine operation enters an idle region and a cruise throttle position when the engine operation enters a cruise region and the control means calculates the command value by selecting the largest value among the throttle positions determined by the second means.

DESCRIPTION OF THE DRAWINGS

The above and other features of the invention will become apparent from the following description made with reference to the drawings.

FIGS. 3A and 3B are a flowchart showing operation of the control unit of FIG. 2;

FIGS. 15A and 15B are a flowchart showing the second embodiment of the throttle control system according to the invention;

DESCRIPTION OF THE PREFERRED EMBODIMENTS

Figure 1:
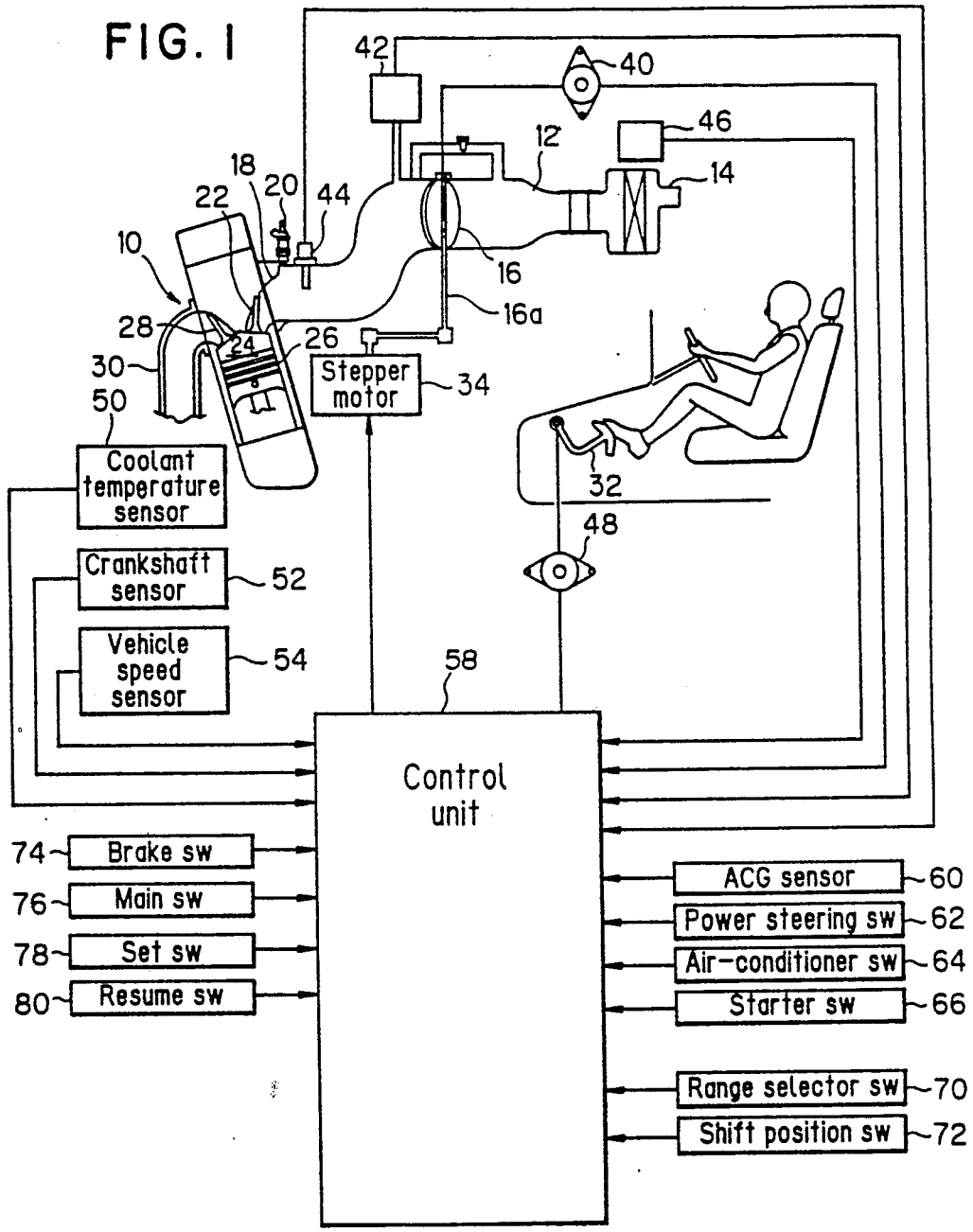
FIG. 1 is an overall schematic view of the throttle control system for a vehicular internal combustion engine according to the invention.

Embodiments of the invention will now be explained with reference to the drawings. FIG. 1 is an overall schematic view of the throttle control system for a vehicular internal combustion engine according to the present invention. In the figure, the reference numeral 10 designates a vehicular internal combustion engine. The engine 10 is equipped with an air intake passage 12 having an air cleaner 14 its one end. The air drawn in through the air cleaner 14 enters an intake manifold 18 while having its flow rate regulated by a throttle valve 16. It is then supplied with fuel by a fuel injection valve 20 and the resulting air-fuel mixture is drawn into a combustion chamber 24 through an intake port opened and closed by an intake valve 22. The air-fuel mixture in the combustion chamber 24 is ignited by a spark plug (not shown) and burns explosively, to cause a piston 26 to be driven downward. The combustion gas thereafter passes out of the combustion chamber 24 through an exhaust port opened and closed by a exhaust valve 28 and enters an exhaust manifold 30, from where it is discharged to the exterior of the engine via an exhaust pipe (not shown).

On the floor near the driver's seat of the vehicle equipped with the engine there is provided an accelerator pedal 32 which is biased to normally maintain the idle position by a spring (not shown) but can be caused to rotate about a supporting shaft when depressed by the foot of the driver. As shown in the figure, the accelerator pedal 32 and the throttle valve 16 are not linked mechanically, but a stepper motor 34 is instead provided in the vicinity of and connected with the throttle valve 16. The connection between the stepper motor 34 and the throttle valve 16 is via a clutch mechanism, a reduction gear mechanism (neither shown) and a shaft 16a of the throttle valve 16. The throttle valve 16 is opened and closed by the stepper motor 34. The valve shaft 16a is fitted with a return spring (not shown) which constantly urges the throttle valve 16 in the closing direction. The position of the throttle valve 16 is detected by a throttle position sensor 40, which may be a potentiometer or the like.

At an appropriate place in the air intake passage 12 downstream of the throttle valve 16 there is provided a manifold absolute pressure sensor 42 and at a further downstream location there is provided a manifold air temperature sensor 44. At an appropriate location on the upstream side of the throttle valve 16 there is provided an atmospheric pressure sensor 46. An accelerator position sensor 48 is provided in the vicinity of the accelerator pedal 32 for detecting the amount of depression (i.e. the position) thereof, while a coolant temperature sensor 50 is provided at an appropriate position in the vicinity of the combustion chamber 24. In addition, a crankshaft sensor 52 for detecting the crankshaft angle is provided at an appropriate position within a distributor (not shown) and a vehicle speed sensor 54 is provided at an appropriate position within a transmission (not shown). The outputs of the aforesaid sensors are sent to a control unit 58.

The throttle control system is further provided with an ACG sensor 60 for detecting the field current of an alternator (not shown), a power steering switch 62 for detecting operation of a power steering mechanism (not shown), an air-conditioner switch 64 for detecting whether or not an air conditioner (not shown) is turned on, a starter switch 66 for detecting whether or not a starter motor (not shown) is operating, a range selector switch 70 for detecting the range position selected by a shift lever (not shown) and a shift position switch 72 for detecting the current gear (by, for example, detecting a solenoid excitation signal in a transmission control unit). The system is further provided with a brake switch 74, a main switch 76, a set switch 78 and a resume switch 80 for cruise control.

Figure 2:
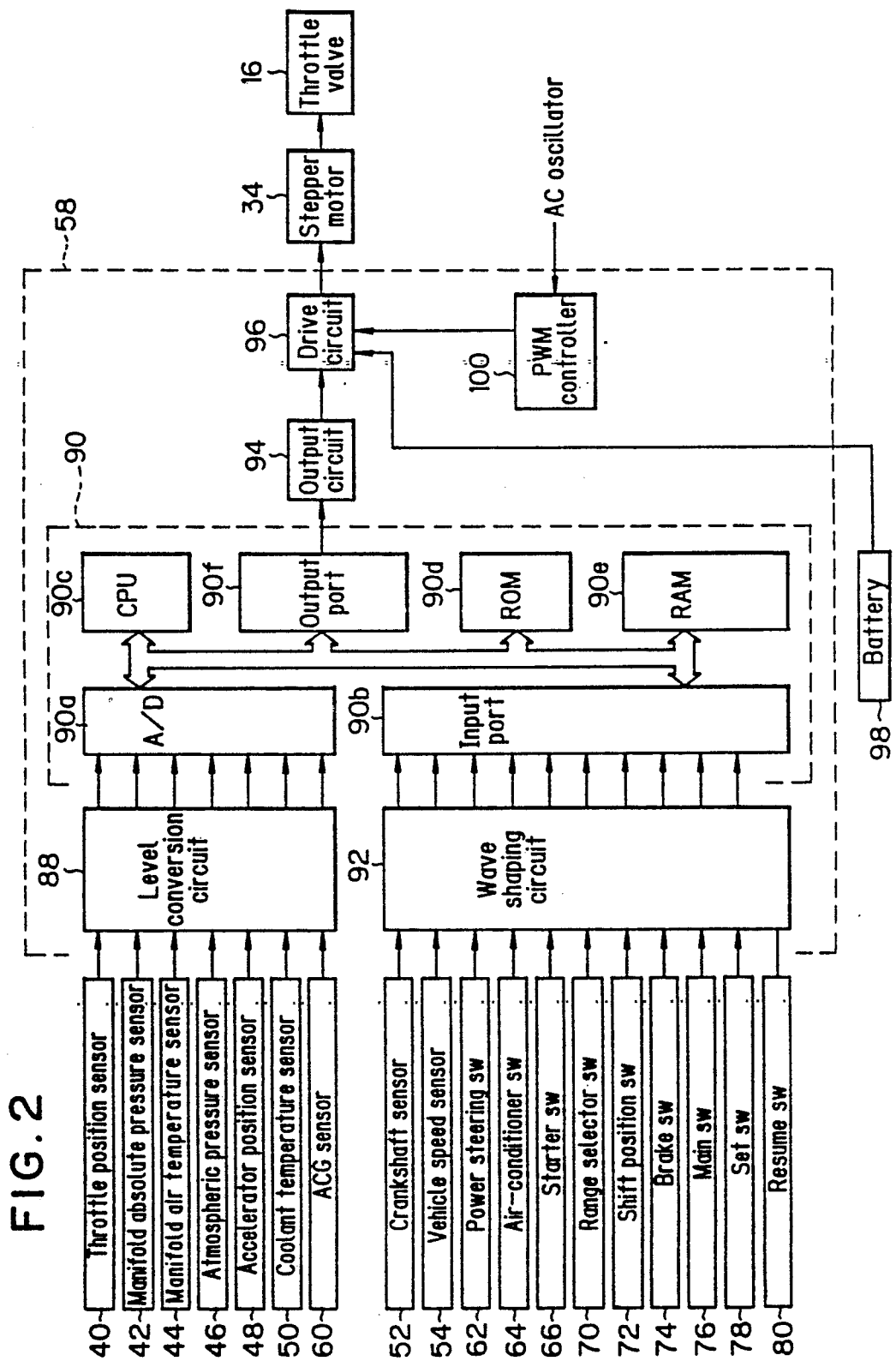
FIG. 2 is a block diagram showing the details of a control unit used in the system of FIG. 1.

The control unit 58 is shown in detail in FIG. 2. Analogue inputs to the control unit 58 such as that from the throttle position sensor 40 are first received by a level conversion circuit 88 which converts them to an appropriate level and sends them to a microcomputer 90 where they are converted to digital values by an A/D (analogue-digital) converter 90a and then temporarily stored in a RAM (random access memory) 90e. Digital inputs such as that from the crankshaft sensor 52 are first waveshaped in a wave shaping circuit 92 and then input to the microcomputer 90 through an input port 90b. In the microcomputer 90, a CPU (central processsing unit) 90c uses the aforesaid inputs for calculating a control value in accordance with a program stored in a ROM 90d and outputs the calculated control value to an output circuit 94 via an output port 90f, from where it is sent to a drive circuit 96 constituted of transistors and the like and used for driving the stepper motor 34. As a result, the position i.e. the degree of opening of the throttle valve 16 is controlled. The drive circuit 96 receives motor drive current from a battery 98. There is also provided a PWM (pulse width modulation) controller 100 which is connected with an ac oscillator (not shown) and serves to vary the chopping duty through PWM control of the current supplied by the battery 98. The frequency of the ac oscillator is fixed at 3 kHz and, as will be explained later, the chopping duty is varied in response to the engine operating condition within a range of, for example, 75-95%.

The operation of the throttle control system will now be explained with reference to the flowchart in FIG. 3. The program of this flowchart is periodically executed at intervals of, for example, 10 ms.

Figure 4:
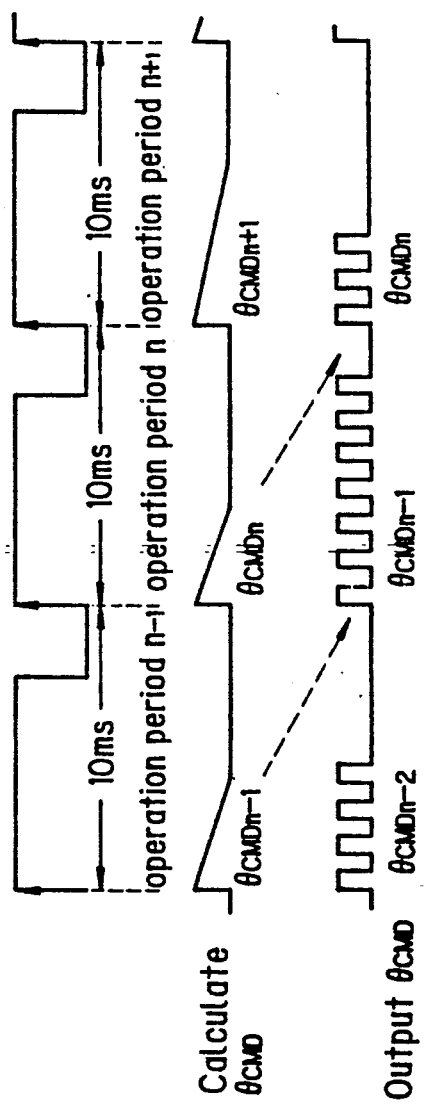
FIG. 4 is a timing chart showing operation cycles of the control unit of FIG. 2.

First, in step S10, the command value $\theta_{CMDn-1}$ is output. This command value is expressed as a number of pulses (amount of rotation of the stepper motor shaft). As shown in FIG. 4, each computation cycle in the present control is set a relatively short 10 ms and the calculated value is not immediately output but is stored for output during the following cycle.

The procedure then advances to step S12 in which the engine speed Ne, the accelerator position $\theta_{AP}$ and the other control parameters are successively read and stored in the RAM 90e, and then to step S14 in which a reference throttle position $\theta_{THM}$ is retrieved from the ROM 90d using the accelerator position $\theta_{AP}$ and the engine speed Ne as address data.

The procedure then moves to step S16 in which it is determined whether or not the state of vehicle operation is in the idle speed control region. This judgment is made on the basis of the aforesaid starter switch signal, the range selector signal, the vehicle speed, the intake air pressure, the throttle position, the engine speed and the like and, in particular, it is judged that the state of vehicle operation is in the idle speed control region if the engine speed is not higher than an appropriate reference engine speed and not lower than an idle discrimination engine speed. If the judgment is affirmative, the procedure then advances to step S18 in which a throttle position $\theta_{idle}$ for idle speed control is appropriately determined, which will be explained with reference to FIG. 5. On the other hand, when it is found in S16 that the state of vehicle operation is not in the idle speed control region, the procedure moves to step S20 in which the idle throttle position is set at a prescribed position $\theta_{idle\text{-}ref}$. This prescribed position is set, for example, as an upper limit position of the idle speed control region of 10 degrees (where WOT=84 degrees).

In the succeeding step S22 it is determined whether the state of vehicle operation is in the cruise control region. This judgment is made on the basis of the output signals from the aforesaid brake switch 74, main switch 76 and the like. When it is found that the state of vehicle operation is in the cruise control region, the procedure advances to step S24 in which an appropriate cruise position $\theta_{cru}$ is calculated (as will be explained later with reference to FIG. 16), and when it is found that it is not in the cruise control region, the cruise position is set to zero at step S26.

In the following step S28 a target throttle position $\theta_{THO}$ is determined. This is done by selecting the largest value from among the already calculated reference throttle position $\theta_{THM}$, idle position $\theta_{idle}$ and cruise position $\theta_{cru}$. Selection of the largest value in this way makes it possible to obtain an optimum throttle position satisfying both idle speed control and cruise control even in cases where the state of vehicle operation is one in which the idle speed control region and the cruise control region overlap. Since the value selected as being the largest is expressed as a degree of opening, it is divided by a prescribed constant (degree of opening per pulse) to convert it into a number of pulses.

The procedure then goes to step S30 in which the command value $\theta_{CMDn-1}$ calculated in the preceding cycle and output in step S10 of the current cycle is added to the throttle position $\theta_{THPn-1}$ in the preceding cycle to obtain the current throttle position, or more precisely the throttle position $\theta_{THPn}$ toward which the throttle valve is currently moving. Next, in step S32, the deviation between the current throttle position and the target throttle position is calculated and the command value $\theta_{CMDn}$, i.e. the motor shaft rotation defined by pulses for the current cycle is determined.

The procedure then advances to step S34 in which it is determined whether or not the absolute value of the current command value (i.e. the value irrespective of whether it represents normal or reverse motor rotation) exceeds an upper limit $\theta_{MAX}$, and if it does, the control value is limited to the maximum value in the direction concerned (S36, S38 and S40). The upper limit $\theta_{MAX}$ represents the upper limit of the value (number of pulses) that can be output within the 10 ms operation period. More specifically, this limit is established because the calculation of the current position in step S30 cannot be carried out accurately if the command pulses for a single cycle are output over two or more cycles. The establishment of the limit thus makes it possible to accurately ascertain the current position.

Next, in step S42, another limit check is carried out with respect to the command value. This is for determining whether or not the throttle valve is capable of moving in compliance with the command. In step S42 the direction of valve rotation is determined and if the rotation is found to be in the valve opening direction, the procedure moves to step S44 in which there is recalculated a control value which will enable the throttle valve to move in accordance with the calculated command value. More specifically, since the value obtained by subtracting the current throttle position $\theta_{THPn}$ from the limit throttle position $\theta_{THMAX}$ corresponding to the maximum degree to which the throttle valve can physically be opened represents the range of possible throttle valve movement, this value is compared with the calculated command value and the smaller of the two is selected. As was mentioned earlier, a spring is attached to the valve shaft 16a of the throttle valve 16 and this spring biases the throttle valve toward the fully closed position. Thus if the stepper motor 34 should be supplied with a command value for moving the throttle valve 16 to a position beyond its fully opened position, the stepper motor 34 would cease to function properly from the time that the throttle valve came into abutment with its stop and, as a result, would be immediately returned to its fully closed state by the force of the spring, resulting in a sudden decrease in engine power. Thus the smaller of the two values is selected to avoid this problem. If the command value is for moving the valve in its closing direction, then since the current throttle position is defined as a positive value with respect to the fully closed position defined as zero, the command value can be limited to within the possible range of throttle valve movement simply by comparing the control value (absolute value) and the current position and selecting the smaller of the two (step S46). In this case, while there is no problem regarding the spring force, use of the arrangement just mentioned makes it possible to eliminate the output of pulses which are not required for the operation of the throttle and thus contributes to the computation speed and the control response of the system. As was explained earlier, the calculated command value is not immediately output but is stored in the RAM 90e and output in step S10 of the following program cycle.

In the flowchart, the throttle valve is connected with the stepper motor and detection is made based on the vehicle operation parameters as to whether the state of vehicle operation is currently in the idle speed control region, the cruise region or some other region. A throttle position is then determined for each of the pertinent operating states and the largest of the determined throttle positions is selected for supply to the stepper motor for opening or closing the throttle valve, as the case may be. Because of this arrangement, it is possible to determine an appropriate throttle position under any and all operating states. For example, even if the operating state should be one in which the idle speed control region and the cruise control region overlap, it is possible to obtain an optimum throttle position satisfying both regions.

Figure 3B:
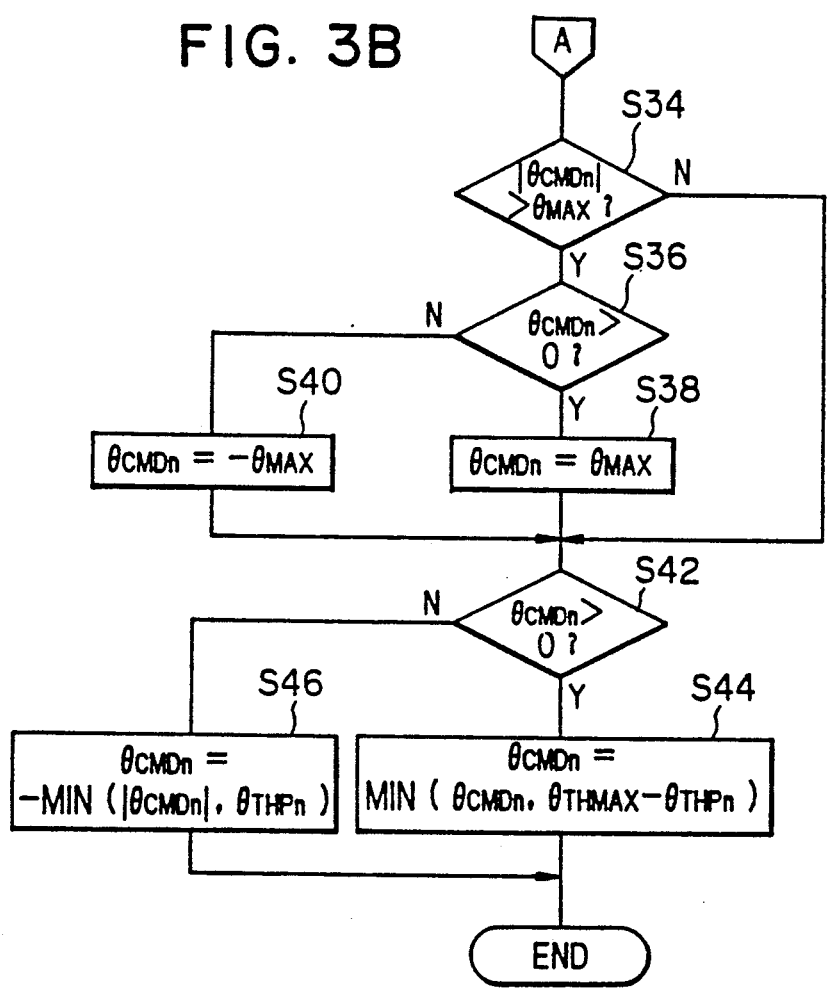
Figure 5:
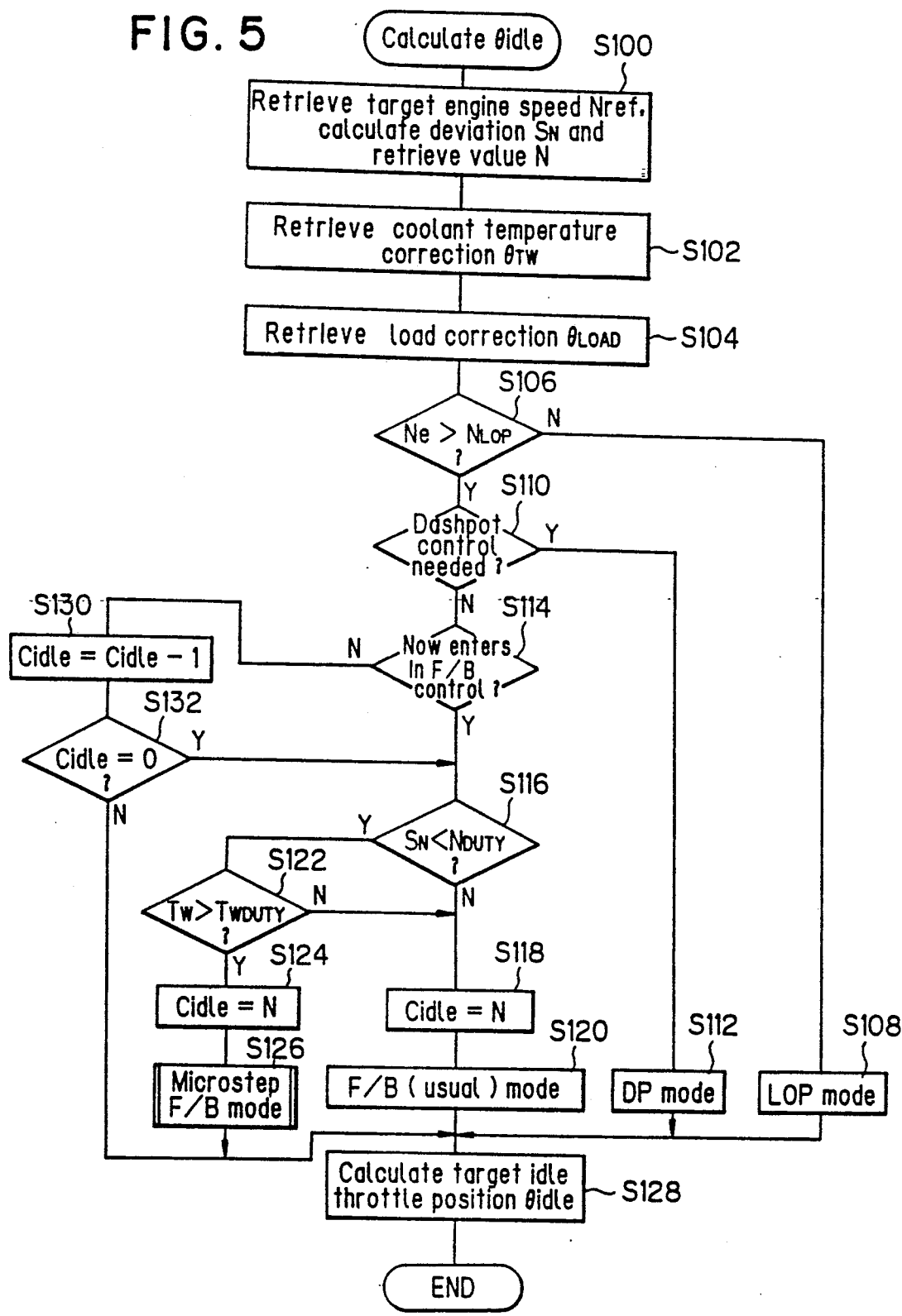
FIG. 5 is a flowchart showing, a subroutine of the flowcharts of FIGS. 3A and 3B for carrying out idle throttle position calculation.
Figure 6:
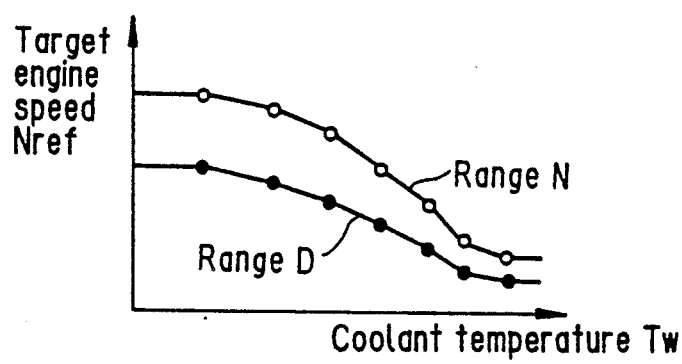
FIG. 6 is a graph showing characteristics of a target engine speed used in the idle throttle position calculation and defined with respect to a coolant temperature.

FIG. 5 shows a subroutine for carrying out the idle position calculation in the flowchart of FIG. 3. The subroutine starts with step S100 in which a target engine speed $N_{ref}$ for idle feedback control is retrieved and the deviation SN between the retrieved target engine speed and the actual engine speed is calculated. FIG. 6 shows a graph for explaining characteristics of the target engine speed $N_{ref}$. As shown, the target engine speed $N_{ref}$ differs between the D range, in which a load is present, and the N range, in which one is not present. The illustrated characteristics have been stored in tabular form in the ROM 90d and the table data are retrieved using the coolant temperature $T_w$ as address data. Also in this step, a counter value N corresponding to the calculated deviation SN is simultaneously read out. As will be explained later, this is for changing the length of the control cycle. While the length of each cycle of the control operation is in principle 10 ms in this embodiment, it is extended to between 100 and 500 ms at the time that feedback control is implemented, and this step S100 is for reading out, in accordance with the deviation, the factor (the aforesaid N) by which the basic cycle time is to be multiplied at the time of implementation of the feedback control. Specifically, a table has been stored in the ROM 90d and N is read from this table using the deviation as address data. Moreover, the cycle times set in the table are inversely proportional to the deviation. This is because when the deviation is small it suffices to carry out control gradually over a long period, but when the deviation is large the control has to be carried out quickly within a short time. Thus, if the value of N is 50, for example, this means that the control cycle will be extended to 50 times the length of the basic cycle, i.e. to 500 ms.

The procedure then advances to step S102 in which a coolant temperature correction $\theta_{TW}$ is retrieved from a table in the ROM 90d and to step S104 in which a load correction $\theta_{LOAD}$ relating to a load increased by activation of the air conditioner or the like is also retrieved from a table. The values of these corrections have been appropriately set.

In the following step S106, it is judged whether or not the engine speed Ne exceeds an appropriately set reference low engine speed $N_{LOP}$ and if it has not, the procedure moves to step S108 in which an emergency throttle opening command is determined for rapidly increasing the engine speed. This is an emergency countermeasure to cope with situations in which the engine speed has dropped to such a low level as to make control impossible, as at drive-away or after panic braking.

When the judgment is affirmative in step S106, the procedure moves to S110 in which it is judged whether or not dashpot control is required and when such control is found to be required, the procedure advances to step S112 in which throttle position is determined such that the engine speed is gradually reduced so as to avoid a sharp change in negative pressure. This is mainly for preventing discharge of unburned gas. The decision as to whether or not the dashpot control is necessary is made on the basis of change in engine speed.

If the judgment in step S110 is negative, feedback control is implemented. Since the length of the control cycle is changed in this case, it is first judged in step S114 whether this is the first implementation of the control concerned. If it is, the procedure moves to step S116 in which it is determined whether or not the deviation SN is not larger than an engine speed $N_{DUTY}$ at or below which microstep feedback control (which will be later explained) is permissible and if it is not, the procedure goes to step S118 in which the value N retrieved in step S100 is set in counter $C_{idle}$, whereafter usual feedback control is implemented in step S120. In the usual feedback control, the throttle position is 25 determined by adding the aforesaid coolant temperature correction $\theta_{TW}$ and load correction $\theta_{LOAD}$ to an appropriately set basic feedback amount $\theta_{FB}$. On the other hand, if it is found in step S116 that the deviation is within the permissible engine speed range, the procedure advances to step S122 in which a judgment is made as to whether or not the coolant temperature $T_W$ is not larger than a permissible coolant temperature $T_{WDUTY}$ at or below which the microstep feedback control is permissible and if it is not larger, the usual feedback control is maintained, while if it is larger, the procedure moves to step S124 in which the value N is set in counter $C_{idle}$ and then to step S126 in which the microstep feedback control is implemented. Thus in accordance with the control according to this flowchart, the usual feedback control is conducted until the deviation between the actual engine speed and the target engine speed becomes minute and then at the point where the deviation becomes minute, the microstep feedback control is implemented. In view of this, the value of the permissible engine speed $N_{DUTY}$ is set at a small value of, for example, 150 rpm. Further, the reason for carrying out the judgment regarding coolant temperature in step S122 is that the amount of correction is large in the low coolant temperature region so that there would be no meaning in implementing the microstep feedback control when the coolant temperature is below the specified level, as will be apparent as the description proceeds. The permissible coolant temperature $T_{WDUTY}$ is thus set at a value below which implementation of the microstep feedback control would not be meaningful.

Figure 7:
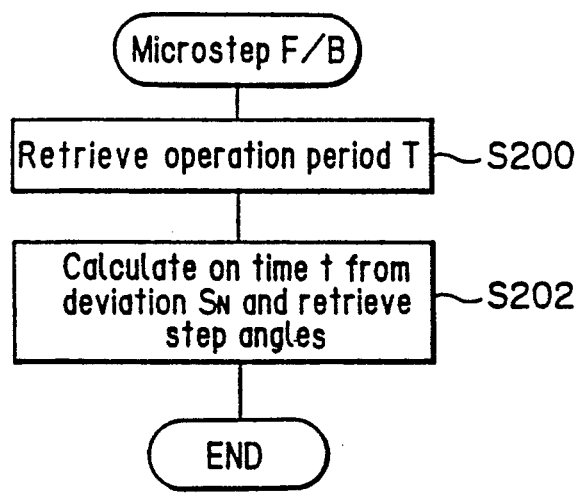
FIG. 7 is a flowchart showing a subroutine of the flowchart of FIG. 5 for carrying out microstep feedback control.
Figure 8:
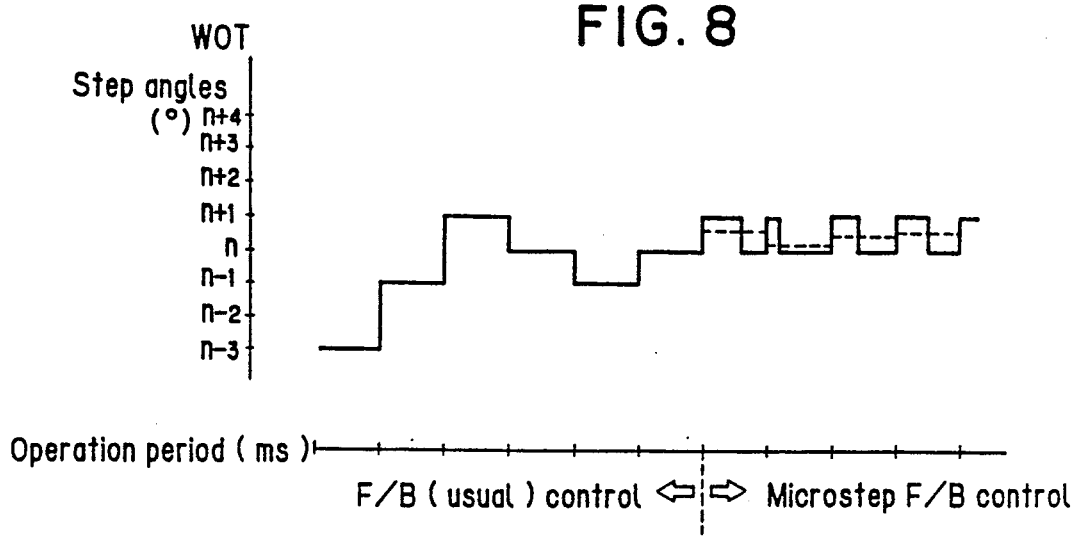
FIG. 8 is a timing chart showing operation of the microstep feedback control shown in the flowchart of FIG. 7.

The subroutine for the microstep feedback control is shown in the flowchart of FIG. 7. Before going into an explanation of the specific procedures, however, a general explanation will be made regarding the microstep feedback control with reference to FIGS. 8 and 9. As shown at the bottom of FIG. 8 and in line with what was explained above, the microstep feedback control is implemented after the actual engine speed has approached the target engine speed and the deviation between the two has become minute. Differently from the cases of the usual feedback control conducted up to this time (or of LOP mode control or DP mode control) in which the stepper motor is rotated in increments of one step angle or more, microstep feedback control rotates the stepper motor in minute increments of less than one step angle, whereby the engine speed can be finely controlled. With respect to a given step angle n and the succeeding step angle n+1, rotation in increments of less than one step is possible by reversing the direction of rotation midway of the operation cycle to obtain the results shown by the broken line in the figure. In the present embodiment, one step angle corresponds to a 0.36 degree change in the throttle position. Further, as explained earlier and shown in FIG. 8, in both the usual feedback control and microstep feedback control the operation cycle is extended to between 100 and 500 ms depending on the value of N.

Figure 9:
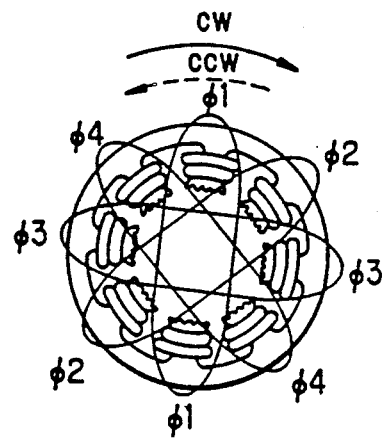
FIG. 9 is an explanatory view showing windings and direction of rotation of the stepper motor used in the system shown in FIG. 1.
Figures 10, 11, 12:
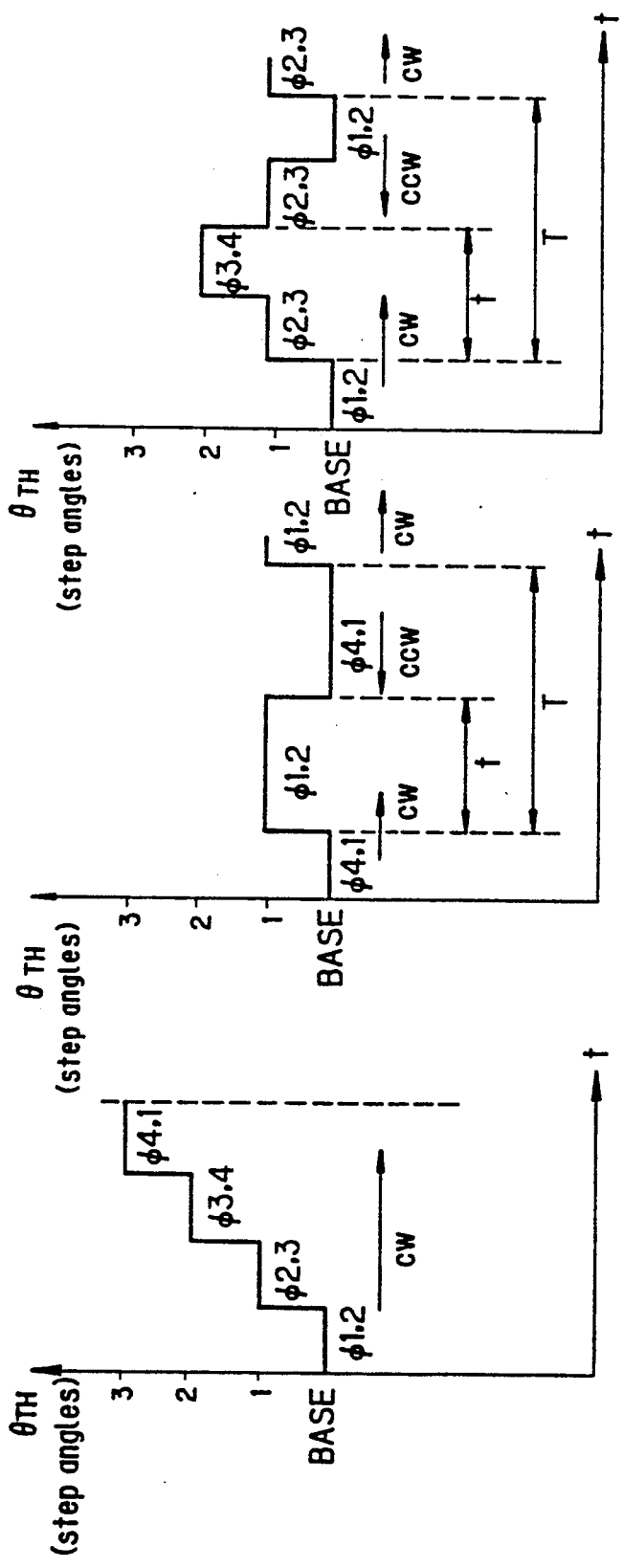
FIGS. 10 to 12 are explanatory timing charts showing motor energization for the microstep feedback control.

FIGS. 9 to 12 show this type of control in greater detail. For easier understanding, the explanation is made with respect to the stepper motor having four windings Phi Phi 1–Phi 4, as shown in FIG. 9. FIG. 10 shows an example of the ordinary switching sequence in which, as is well known, the windings Phi 1–Phi 4 are energized in pairs for rotation in, for example, the clockwise direction. FIG. 11 shows the case of the microstep feedback control in accordance with the present invention. In this case, Phi 4, 1 are first energized, for example, and then Phi 1, 2 are energized to rotate the stator in the clockwise direction. Following this, Phi 4, 1 are energized again. As a result, since Phi 4, 1 in the counterclockwise direction are energized without energizing Phi 2, 3 adjacent in the clockwise direction, the stepper motor rotates in reverse. Following this, if Phi 1, 2 are energized, the rotation will return to the clockwise direction. In this way, by alternately energizing the windings to the left and right of a given winding, the stepper motor can be made to vibrate back and forth within a single step angle. As shown in the figure, if in this case the period during which Phi 1, 2 are energized is defined as t and the length of the whole cycle is defined as T, the operation can be viewed as duty control in which $$\text{Duty} = t/T \times 100\%$$

Therefore, by setting t/T at an appropriate value, it becomes possible to obtain a desired amount of rotation within a range of less than one step angle.

FIG. 12 shows an example in which the microstep feedback control is carried out within the range of two step angles. In this case, energization of Phi 1, 2 is followed by energization of Phi 2, 3 and Phi 3, 4, and then after Phi 2, 3, Phi 1, 2 have been energized in the reverse direction, Phi 2, 3 are again energized in the clockwise direction. Thus in this example, the desired amount of rotation within the range of two step angles can be obtained by setting the value of t/T. It goes without saying that it is also possible to realize similar control over a range of three angle steps. The actual duty resolution in the aforesaid operations is expressed as $$\text{Duty resolution} = \text{Length of control cycle (as timed by the } CPU\text{)/Period } T \times 100\%$$

Figure 13:
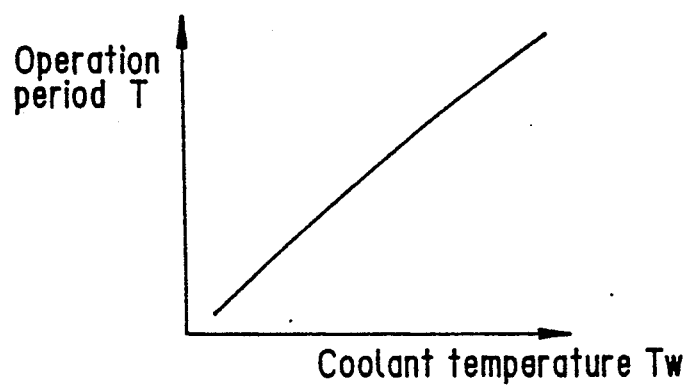
FIG. 13 is a graph showing characteristics of an operation period during the microstep feedback control defined with respect to a coolant temperature.

Returning now to the flowchart of FIG. 7, the procedure begins with step S200 in which the period T is retrieved using coolant temperature $T_W$ as address data. As shown in FIG. 13, the period T is defined to be inversely proportional to the coolant temperature $T_W$. This characteristics have been stored in the ROM 90d. The reason for making the period shorter with lower coolant temperature is that, as shown in FIG. 6, the target engine speed is set to be inversely proportional to the coolant temperature. Since the lower the engine speed becomes, the larger is the change in the amount of intake air at the time the throttle position is changed, it is thus necessary to make the period shorter for carrying out finer control when the coolant temperature is low.

Figure 14:
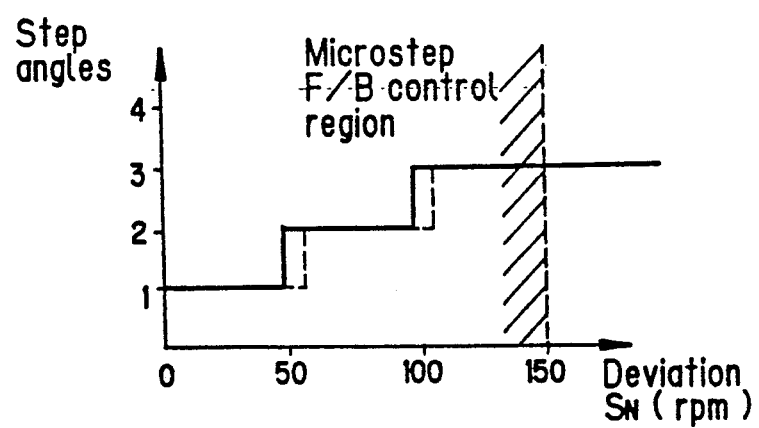
FIG. 14 is a graph showing characteristics of motor step angles subject to the microstep feedback control defined with respect to engine speed deviation.

The procedure then advances to step S202 in which the period t (ON time) is calculated from the deviation SN and the number of step angles is retrieved. FIG. 14 shows the relationship between the deviation and the number of step angles. The reason for making the number of step angles proportional to the deviation is of course because it is preferable for the number of step angles to increase as the deviation becomes larger. In the illustrated example, the microstep feedback control is conducted over the range of two step angles when the deviation is between 50 and 99 rpm. This characteristics have been stored in tabular form in the ROM 90d.

Returning to the flowchart of FIG. 5, the procedure moves to step S128 in which the control value determined in one of the modes (S108, S112, S120, S126) is selected as the idle position $\theta_{idle}$ for idle speed control, and the procedure returns to the main routine shown in the flowchart of FIG. 3. Incidentally, when the judgment in step S114 is negative, the procedure goes to step S130 in which the count value is decremented, and then to step S132 in which the procedure is made to jump to step 128 and return to the main routine in each loop of the procedure until it is found that the counter value has become zero. When the counter value is found to have reached zero in step S132, the procedure advances to step S116, whereafter the usual feedback control mode or the microstep feedback control mode is implemented and the control value is freshly determined. That is to say, when the usual feedback control mode or the microstep feedback control mode is implemented in the subroutine of FIG. 5 and length of the control cycle is extended to, for example, 500 ms, then since the main routine in FIG. 3 completes one cycle in 10 ms, the control value is determined only once at the beginning of the extended cycle and is repeatedly used until the 500 ms period has lapsed.

As explained in the foregoing, in the present embodiment the throttle position is converged toward the target value by use of feedback control and when the deviation between the actual engine speed and the target engine speed has become minute, the throttle valve itself is caused to vibrate back and forth through the use of the microstep feedback control, whereby rotation of the stepper motor by increments of less than one step angle can be realized. This makes it possible to obtain the desired throttle position with high precision.

Figure 15B:
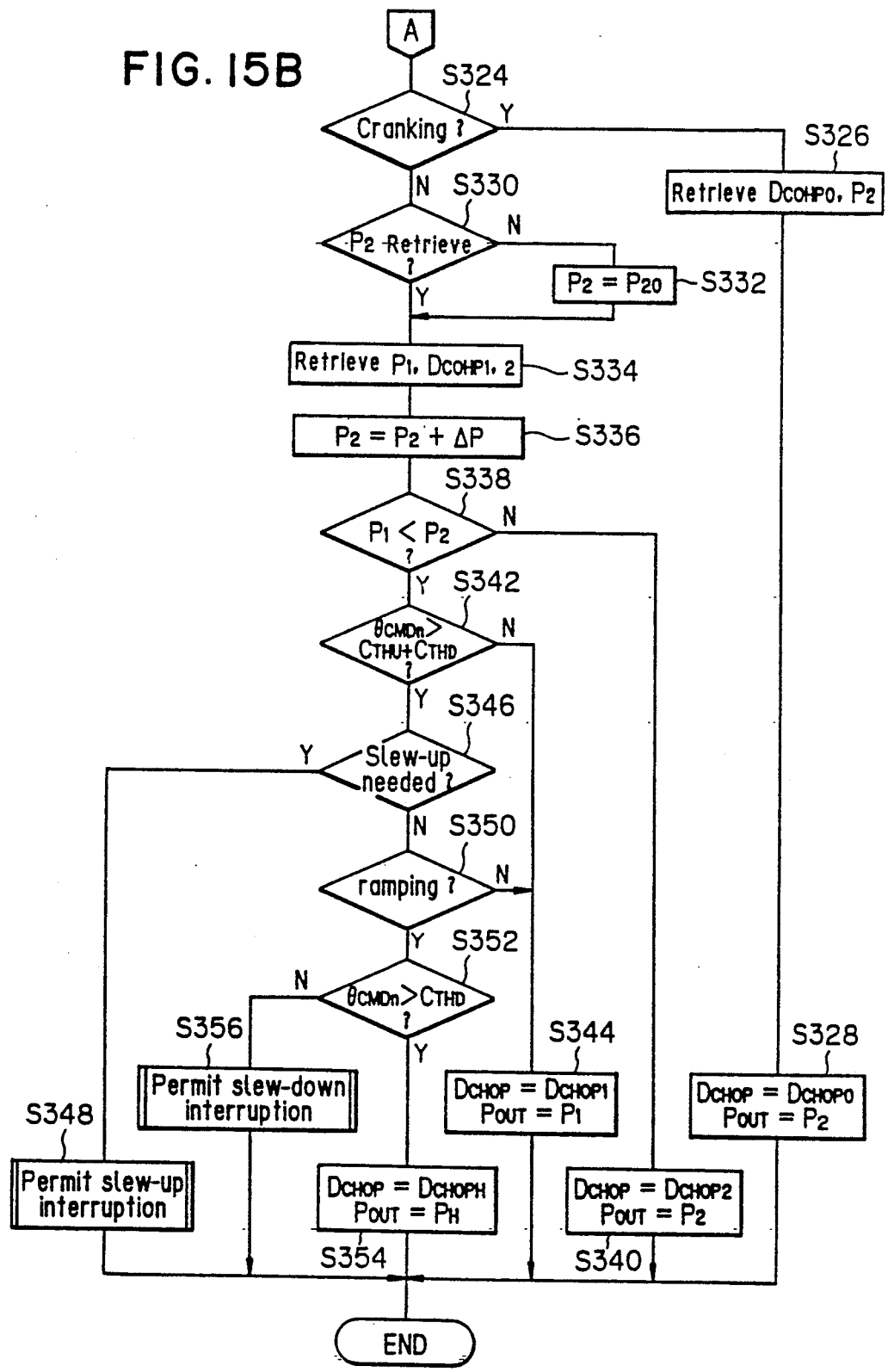

Another embodiment of the invention will now be explained with reference to FIG. 15. Similarly to the case of the flowchart of FIG. 3, the command value $\theta_{CMDn-1}$ calculated in the preceding cycle is output in the first step S300. At the same time, there is output a pulse rate command value indicating the motor rotation speed and a chopping duty command value, as will be later explained. In the ensuing procedures S302 to S310, the reference throttle position is retrieved and judgment is made as to whether the state of vehicle operation is in the idle speed control region. The procedure then goes to step S312 in which it is judged whether or not the operation is in the cruise control region and if the judgment is affirmative, moves to step S314 in which the cruise position $\theta_{cru}$ is calculated.

Figure 16:
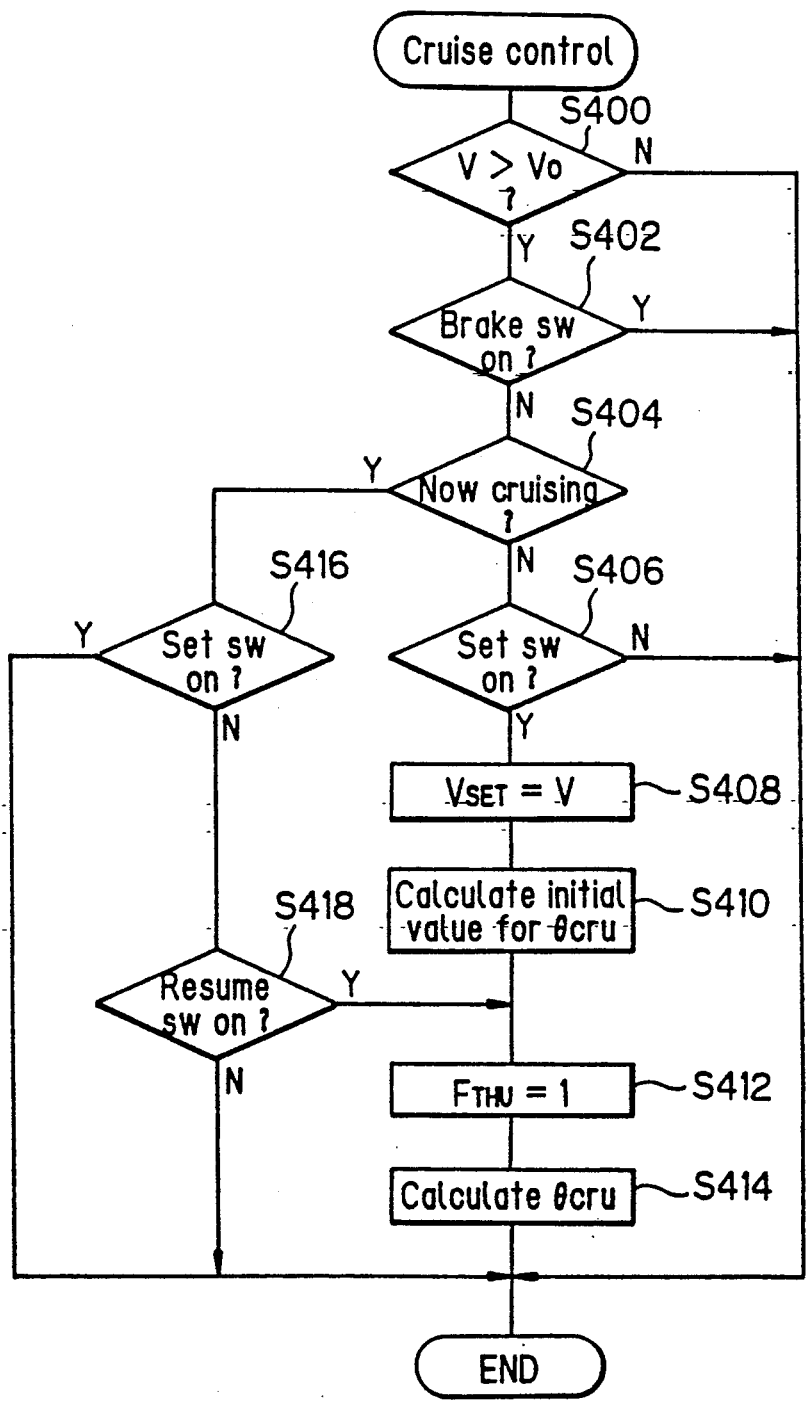
FIG. 16 is a flowchart showing a subroutine of the flowcharts shown in FIGS. 3A, 3B and 15A, 15B for determining a throttle position during vehicle cruising.

The subroutine for calculating the cruise position is shown in FIG. 16. Since the cruise control per se is not a theme of the subject invention, the calculation will be briefly explained. Namely, if the vehicle speed is not less than a prescribed speed of 20 km/h, the brake switch is OFF, cruise control has not already been implemented and the cruise control set switch is ON, the vehicle speed at that time is taken as the set vehicle speed $V_{SET}$ (S400–S408), an initial set amount is calculated for bringing the throttle position close to the throttle position corresponding to the set vehicle speed, a FLAG $F_{THU}$ is turned on, and the cruise throttle position $\theta_{cru}$ is determined (S410, S412, S414). The same applies in the case where the set switch is OFF and the resume switch is ON (S416, S418). It should be noted that this flowchart is also applied to the subroutine at step S24 in the flowchart shown in FIG. 3, as was earlier explained.

Returning to FIG. 15, the procedure advances to step S318 in which the largest of the calculated throttle positions is selected as the target throttle position $\theta_{THO}$, whereafter the procedure goes to step S320 and then to step S322 in which the stepper motor command value $\theta_{CMDn}$ for the current cycle is determined.

The procedure then advances to step S324 in which it is judged from the starter signal whether or not the engine is being cranked. If it is found that cranking is in progress, the procedure moves to step S326 in which a chopping duty $D_{CHOP0}$ for cranking and a pulse rate $P_2$ are retrieved, and then to step S328 in which the chopping duty $D_{CHOP}$ is set to the value $D_{CHOP0}$ and the pulse rate $P_{OUT}$ is set to the value $P_2$.

Figure 17:
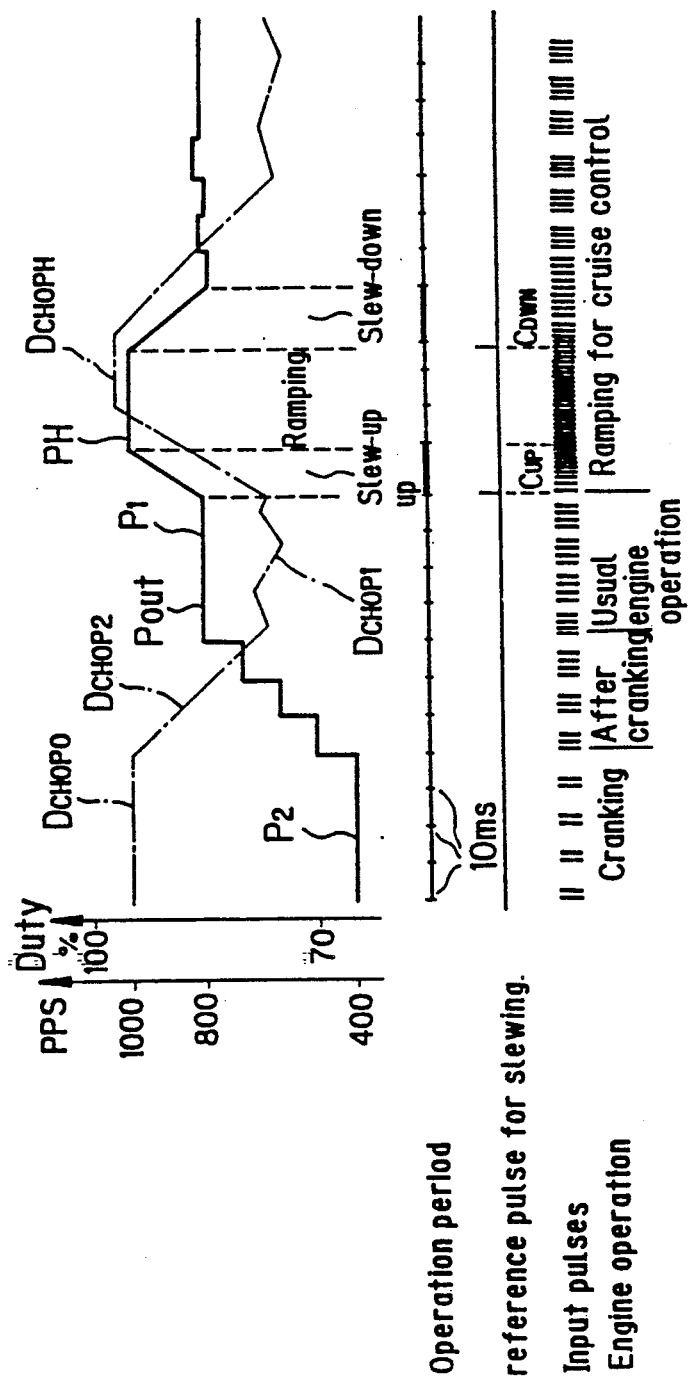
FIG. 17 is an explanatory view showing the second embodiment of the system, wherein a pulse rate and a chopping duty are varied in accordance with vehicle operating condition including engine cranking.
Figure 18:
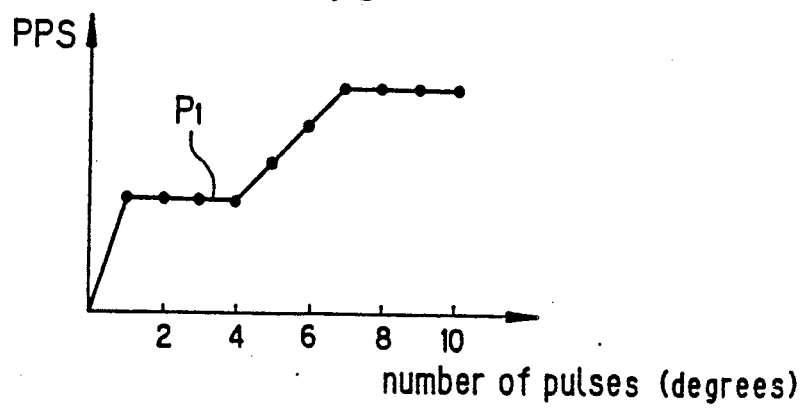
FIG. 18 is a graph showing characteristics of the pulse rate during vehicle operating condition other than engine cranking and an after cranking period following thereto.
Figure 19:
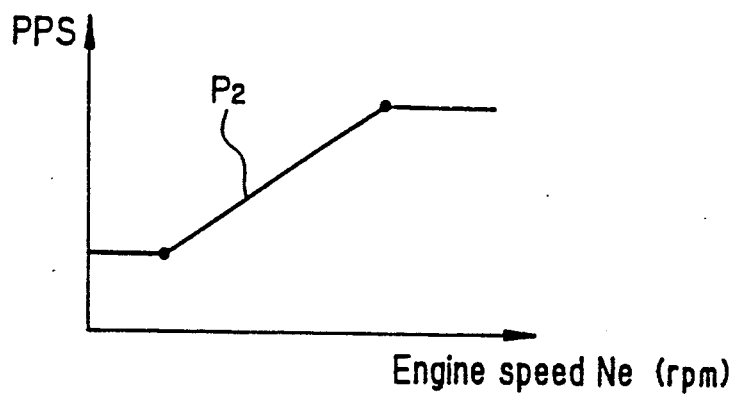
FIG. 19 is a graph similar to FIG. 18, but shows characteristics of the pulse rate during the engine cranking.
Figure 20:
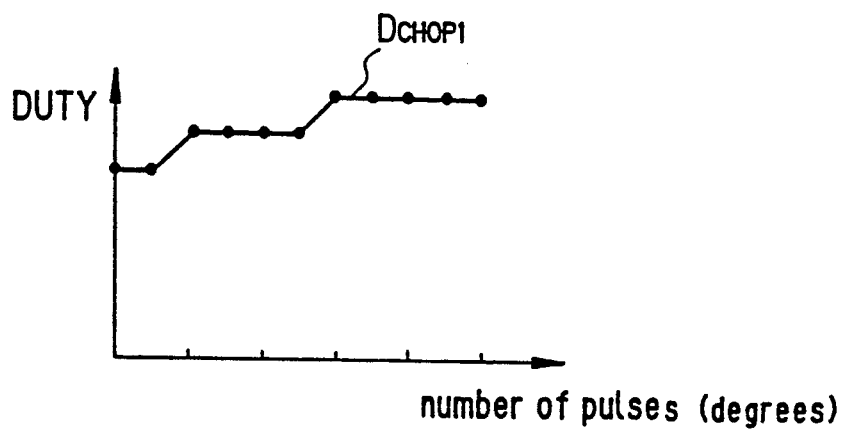
FIG. 20 is a graph showing characteristics of the chopping duty during vehicle operating condition other than the engine cranking and the after cranking period following thereto.

The features of this embodiment will be briefly explained with reference to FIG. 17. In this figure, time is represented on the horizontal axis, while the pulse rate and the chopping duty are represented on the vertical axis. During cranking of the engine the pulse rate is reduced to 400 pps (pulses per second) ($P_{OUT}=P_2$) and the chopping duty is set at the relatively high rate of 95% ($D_{CHOP}=D_{CHOP0}$). In other words, since the battery voltage drops because of the drain on the battery by the starter motor, the pulse rate is reduced and the chopping duty is increased to obtain the required motor torque. Further, in the transient state during which the engine assumes its normal operating condition following cranking, the pulse rate is increased gradually in increments of 100 pps, while the chopping duty $D_{CHOP2}$ is gradually reduced. Then once the engine is operating normally, the pulse rate $P_1$ is set at an appropriate value in the vicinity of 800 pps in accordance with the operating condition and the chopping duty $D_{CHOP1}$ is changed in accordance with the amount of motor rotation. FIGS. 18 to 20 show the pulse rate $P_1$ during normal operation, the pulse rate $P_2$ during cranking, and the chopping duty during normal operation. As shown in these figures, the pulse rate $P_1$ and chopping duty $D_{CHOP1}$ during normal operation are increased/decreased in accordance with the number of pulses i.e. the amount of motor rotation (the aforesaid $\theta_{CMDn}$)(wherein the chopping duty will be raised to increase motor torque in case that the amount of rotation is large) and the pulse rate $P_2$ during cranking is increased as the engine speed Ne increases. These characteristics have been stored in tabular form in the ROM 90d.

Returning to FIG. 15, when it is found in step S324 that cranking is not in progress, the procedure advances to step 330 in which it is judged whether or not the pulse rate $P_2$ during cranking has been retrieved and if it has not, the procedure moves to step S332 in which $P_2$ is assigned an appropriately set value $P_{20}$. This is for including the case in which the engine is started, not by the starter, but by some other means such as pushing the vehicle.

In the following step S334, the pulse rate $P_1$ during usual operation, the after-cranking chopping duty $D_{CHOP2}$ and the chopping duty $D_{CHOP1}$ for usual operation are retrieved. This is done by reading the values from the ROM 90d, in which the characteristics shown in FIGS. 18 to 20 are stored in tabular form. While not illustrated in the drawings, the characteristics of the after-cranking chopping duty $D_{CHOP2}$ are similar to those shown in FIG. 20 and the corresponding characteristics have been similarly stored in tabular form.

The procedure then advances to step S336 in which the pulse rate $P_2$ during cranking is incremented by a prescribed value Delta P (the aforesaid 100 pps), and then to step S338 in which it is judged whether the pulse rate $P_1$ during usual operation has been exceeded. If it has not been exceeded, since this means that the engine is still in a transient state, the procedure moves to step S340 in which the value of the command $D_{CHOP}$ is set to $D_{CHOP2}$ and $P_{OUT}$ is set to $P_2$. In this case, the pulse rate is gradually increased as shown in FIG. 17 so as to prevent the stepper motor from becoming out of control, while the chopping duty is appropriately varied in accordance with the number of pulses (the amount of motor rotation).

The procedure then moves to step S342 in which it is judged whether or not the command value $\theta_{CMDn}$ exceeds both the number of pulses $C_{THU}$ corresponding to the number of angular steps required for making slew-up and the number of pulses $C_{THD}$ corresponding to the number of angular steps necessary for making slew-down resulted therefrom. More specifically, as shown in FIG. 17, under a prescribed operating state (in this embodiment, when the flag $F_{THU}$ in step S412 is turned on in the course of cruise acceleration processing in FIG. 16), slew-up is carried out for entering the ramping mode and then slew-down is carried out for returning to the original state. In this case, slew-up is automatically followed by slew-down and, as a result, the command value $\theta_{CMDn}$ must exceed the number of pulses required for slewing up and down, i.e. must exceed both $C_{THU}+C_{THD}$. For example, where three pulses are required for slew-up and three for slew-down, a rotational range of at least 6 pulses has to be left there. Thus, in the flowchart of FIG. 15, when the judgment in step S342 is negative, the procedure advances to step S344 in which the chopping duty DCHOP1 and pulse rate P1 during normal operation are appropriately determined in light of the amount of motor rotation.

When the judgment in step S342 is affirmative, the procedure advances to step S346 in which it is judged whether or not slew-up is required. This is judged from the flag of step S412 in the flowchart of FIG. 16, and where it is found that slew-up is necessary, the procedure moves to step S348 in which permission is given for slew-up interruption. Since during cruise acceleration processing prompt opening/closing of the throttle is required, among the interruptions top priority is given to slew-up interruption.

Figure 21:
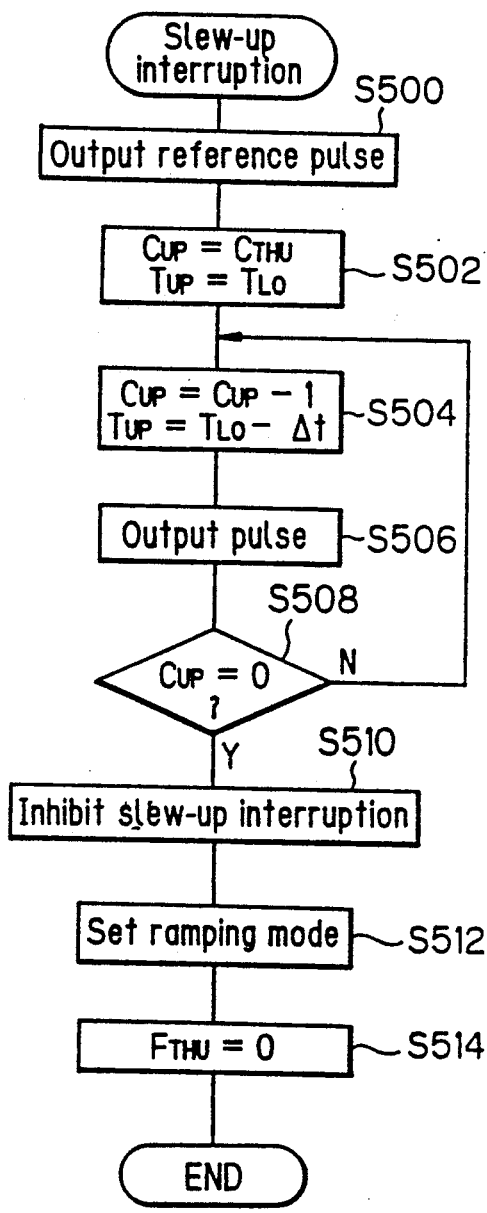
FIG. 21 is a flowchar,t showing a subroutine of the flowchart of FIGS. 15A & 15B for slew-up operation.

The subroutine for this slew-up interruption processing is shown by the flowchart of FIG. 21. First, in the step S500, a single reference pulse is output as shown in FIG. 17. This is for providing a reference for the start of slew-up. Next, in step S502, a down counter $C_{UP}$ and a timer $T_{UP}$ are set to prescribed values $C_{THU}$ and $T_{LO}$. The counter value $C_{UP}$ indicates the number of pulses required for completing the slew-up, while the timer value $T_{UP}$ determines the interval between pulses in ms. The procedure then goes to step S504 in which the counter value is decremented by one and the timer value is decremented by a prescribed amount Delta t, and then to step S506 in which pulse output is started. In the succeeding step S508 it is judged whether or not the counter value has reached zero and if it has not, the procedure returns to step S504 and the output of pulses is continued with simultaneous decrementing. The interval between pulses initially equal to the timer value $T_{LO}$ grows shorter with each succeeding loop. After the counter value reaches zero and it has been confirmed that the output of the determined number of pulses has been completed, the procedure goes to step S510 in which slew-up interruption is inhibited, to step S512 in which the ramping mode is implemented, and then to step S514 in which the flag $F_{THU}$ is turned OFF, whereafter the procedure returns to the flowchart of FIG. 15. As will be understood from the foregoing, since the interruption processing cannot be carried out when waiting for the normal 10-ms cycle intervals, the processing is carried out continuously.

In the succeeding cycle of the program, it is found in step S350 that the ramping mode is in progress so that the procedure advances to step S352 and then to step S354 in which the output of pulses is continued at a high-speed pulse rate until the target number of pulses has reached the number of pulses $C_{THD}$ required for making slew-down. As shown in FIG. 17, pulses are output in the ramping mode at a high rate of, for instance, 1000 pps. Further, the chopping duty is raised to the value $D_{CHOPH}$.

Figure 22:
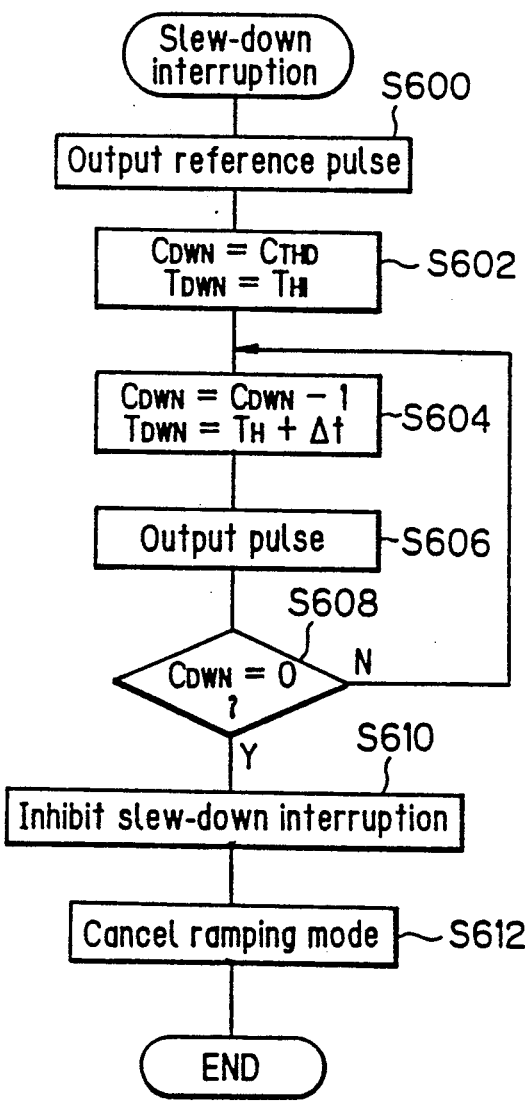
FIG. 22 is a flowchart showing a subroutine of the slew-down operation.

After a number of program cycles, when it is found in step S352 that the target number of pulses has reached the number of pulses required for carrying out slew-down, the procedure moves to step S356 in which slew-down interruption is permitted. The subroutine for this slew-down interruption is shown in FIG. 22. After the reference pulse for commencement of slew-down has been output in step S600, the procedure moves to step S602 in which the counter value $C_{DWN}$ is set at a value $C_{THD}$ indicating the number of pulses necessary for completing slew-down and the timer $T_{DOWN}$ is set at an appropriate time value $T_{HI}$ indicating the interval between these pulses. The counter value is decremented with each loop of the procedure until the set value is reached. (S604, S606, S608). In this case, as shown in FIG. 17, the interval between the pulses is gradually increased in increments of Delta t. Once the set value has been reached the set value the slew-down interruption is discontinued and the ramping mode is canceled (S610, S612). Similarly to the case of the slew-up operation, continuous output of pulses is also maintained during the slew-down operation. As regards the chopping duty, there is used the same chopping duty $D_{CHOP1}$ as employed during usual operation. When it is judged in step S350 of the flowchart of FIG. 15 that the ramping mode is not being implemented, the procedure advances to step S344 in which commands are issued to restore the pulse rate and duty for usual engine operation.

In the foregoing operations, after determination of the command value $\theta_{CMDn}$, the pulse rate $P_{OUT}$ and the chopping duty $D_{CHOP}$, the determined values are temporarily stored in the RAM 90e and are output as $\theta_{CMDn-1}$, $P_{OUTn-1}$ and $D_{CHOPn-1}$ at the beginning of the next cycle of the program, unless slew-up or slew-down interruption is to be conducted.

While the starter signal is used for the detection of cranking in this embodiment, it is alternatively possible to make the judgment from the engine speed.

As explained above, on the assumption that the battery voltage will drop during cranking, the pulse rate is lowered and the chopping duty increased for boosting the stepper motor torque. Thus, the stepper motor is able to operate properly even during such a voltage drop. Further, since the pulse rate is gradually increased during the transient period after cranking, there is no danger of the stepper motor being out of control during this period. Also, since the pulse rate and the chopping duty are varied depending on the operating condition of the engine, an effective and reliable motor operation can be obtained.

Moreover, in this embodiment it is judged at the time of conducting slew-up whether or not the target amount of positional change exceeds the amount of change necessary for fulfilling both the slew-up and slew-down and slew-up is conducted only if this amount is exceeded. Thus the stepper motor can be appropriately controlled for regulation of the throttle position, whereby the vehicle speed can be made to converge promptly on the set value during cruise control.

In the embodiments described in the foregoing, no mechanical linkage whatsoever is provided between the accelerator pedal and the throttle valve. It should be understood, however, that it is alternatively possible to leave the conventional wire or other mechanical linkage between the two and to provide the stepper motor according to this invention in addition.

It should be, furthermore, noted that, while the above description discloses preferred embodiments of the invention, numerous modifications or alterations may be made without departing from the scope of the invention as set forth in the following claims.

What is claimed is:

1. A system for controlling throttle position in a vehicular internal combustion engine, comprising:
   first means for detecting operating conditions of the engine including a degree of depression of an accelerator pedal provided on the vehicle floor and an engine speed;
   second means for determining a target position of a throttle valve provided in an engine air intake passage in accordance with the detected degree of depression of the accelerator pedal and the engine speed;
   the second means periodically checking an engine operation region and further determining an idle throttle position when the engine operation region is found to enter an idle operation region and a cruise throttle position when the engine operation region is found to enter a cruise control operation region;

control means for determining a command value in accordance with the determined target position;

the control means calculating the comman value by selecting the largest among the throttle positions determined by the second means; and actuator means connected to the throttle valve for moving the valve in response to the command value.

2. A system according to claim 1, wherein said actuator is a stepper motor and said control means periodically calculates the comman value and outputs the same to the actuator at the beginning of the next calculation period.

3. A system according to claim 2, wherein said control means calculates the command value such that the command value can be output within the calculation period.

4. A system according to claim 3, wherein said control means calculates th command value such that the throttle valve is capable of moving in accordance with the command value.

5. A system according to claim 1, wherein said first means detects engine speed and said second means determines a target engine speed when the engine operation is found to enter the idle control region upon receipt of an output signal from said first means, said second means determining the target throttle position such that deviation between the target and detected engine speeds is decreased.

6. A system according to claim 5, wherein said target engine speed is varied in accordance with a selected gear range.

7. A system according to claim 6, wherein said target engine speed is varied in accordance with a detected coolant temperature.

8. A system according to claim 5, wherein said actuator is a stepper motor and said control means calculates the command value such that the throttle valve moves by a distance corresponding to a fraction of the distance between motor step angles when the deviation decreases to within a predetermined range.

9. A system according to claim 8, wherein said control means calculates the command value such that the throttle valve vibrates back and forth by switching the energization direction of the motor at predetermined time intervals.

10. A system according to claim 9, wherein the length of the predetermined time interval is varied in accordance with the engine operating condition.

11. A system according to claim 5, wherein said control means periodically calculates the command value in accordance with the determined throttle position and the length of the calculation period is varied in accordance with the deviation.

12. A system according to claim 11, wherein the length of said calculation period is varied in inverse proportion to the deviation.

13. A system according to claim 1, wherein said actuator is a stepper motor whose chopping duty can be varied and said control means receives the output signal of the first means and calculates the command value to change the pulse rate and the chopping duty, solely or in combination, in accordance with the engine operating condition.

14. A system according to claim 1, wherein said actuator is a stepper motor and said first means detects engine cranking, said control means receiving the output signals of the first means and calculating the command value for changing the pulse rate when engine cranking is detected.

15. A system according to claim 14, wherein said control means continues to change the pulse rate for a predetermined interval after cranking has been completed.

16. A system according to claim 14, wherein the chopping duty of said stepper motor can be varied and said control means calculates the command value such that the pulse rate and the chopping duty are varied when engine cranking is detected.

17. A system according to any one of claims 14 to 16, wherein said first means detects engine cranking based on activation of an engine starter motor.

18. A system for controlling throttle position in a vehicular internal combustion engine, including:

first means for detecting operating condition of the engine including the degree of depression of an accelerator pedal provided on the vehicle floor;

second means for determining a target position of a throttle valve provided in an engine air intake passage in accordance with the detected degree of depression of the accelerator pedal;

control means for determining a command value in according with the determined target position; and actuator means connected to the throttle valve for moving the valve in response to the command value;

wherein the improvement comprises:

the second means further determining an idle throttle position when the engine operation enters an idle region and a cruise throttle position when the engine operation enters a cruise control region; and the control means calculating the command value by selecting the largest among the throttle positions determined by the second means;

wherein said actuator is a stepper motor and said control means receives the output signals of the first means, said control means discriminating whether the engine operation has entered a region where the stepper motor is to be slewed up and, when the result of the discrimination is affirmative, calculating the command value for slewing up the motor after confirming that the number of angular steps to the target position exceeds that for finishing slewing up and slewing down.

19. A system according to claim 18, wherein said region is the region of vehicle acceleration during cruise control.

20. A system according to claim 18 or 19, wherein said confirmation is assigned priority over all other confirmations.

* * * * *